United States Patent
Gagnon

(10) Patent No.: US 6,940,394 B2
(45) Date of Patent: Sep. 6, 2005

(54) COMPUTERIZED SYSTEM FOR THE MANAGEMENT OF PERSONNEL RESPONSE TIME IN A RESTAURANT

(76) Inventor: Bruno Gagnon, 113 Chemin des Copains, Laterriere (CA), G7N 1X6

(*) Notice: Subject to any disclaimer, the term of this patent is extended or adjusted under 35 U.S.C. 154(b) by 67 days.

(21) Appl. No.: 10/650,378

(22) Filed: Aug. 28, 2003

(65) Prior Publication Data

US 2005/0046547 A1 Mar. 3, 2005

Related U.S. Application Data

(60) Provisional application No. 60/406,573, filed on Aug. 29, 2002.

(51) Int. Cl.[7] ................................................. G08B 5/00
(52) U.S. Cl. .................. 340/286.09; 340/321; 340/332
(58) Field of Search ........................ 340/286.09, 286.02, 340/286.06, 311.1, 825.08, 825.07, 825.29, 540, 321, 825.69, 825.72, 5.9, 7.2, 10.6, 573.1, 332, 7.22, 7.35, 539.1, 539.11, 5.5, 5.91, 5.92; 705/11, 15, 21, 26; 395/215; 350/49; 186/39; 235/383; 380/270; 455/73; 341/22

(56) References Cited

U.S. PATENT DOCUMENTS

| | | | |
|---|---|---|---|
| 4,530,067 A | 7/1985 | Dorr | 364/401 |
| 4,569,421 A | 2/1986 | Sandstedt | 186/39 |
| 4,701,849 A | 10/1987 | Elden | 364/401 |
| 4,777,488 A | 10/1988 | Carlman | 340/825.72 |
| 4,935,720 A | 6/1990 | Kalfoun | 340/286.09 |
| 5,272,474 A | 12/1993 | Hilliard | 340/825.08 |
| 5,594,409 A | 1/1997 | Shank | 340/326 |
| 5,838,798 A | 11/1998 | Stevens | 380/49 |
| 6,087,927 A * | 7/2000 | Battistini et al. | 340/286.09 |
| 6,366,196 B1 | 4/2002 | Green | 340/286.09 |
| 6,580,360 B1 * | 6/2003 | McKee et al. | 340/286.09 |
| 6,831,549 B2 * | 12/2004 | Foster et al. | 340/286.09 |

* cited by examiner

Primary Examiner—Brent A. Swarthout

(57) ABSTRACT

The present invention relates to restaurants, computer networks, wireless portable computers and more specifically to a restaurant service and transaction monitoring; time management; and processing system and method.

20 Claims, 7 Drawing Sheets

32

| ENTRÉE | MAIN COURSE | DESSERT |
|---|---|---|
| Mark 28   00:38 | Mark 30   02:20 | Mark 3   01:20 |
| Jenny 11   01:22 | | Mark 18   01:35 |
| Jenny 14   02:20 | | |
| Mark 20   02:40 | | |
| Mark 22   03:00 | | | waiter help
entry code

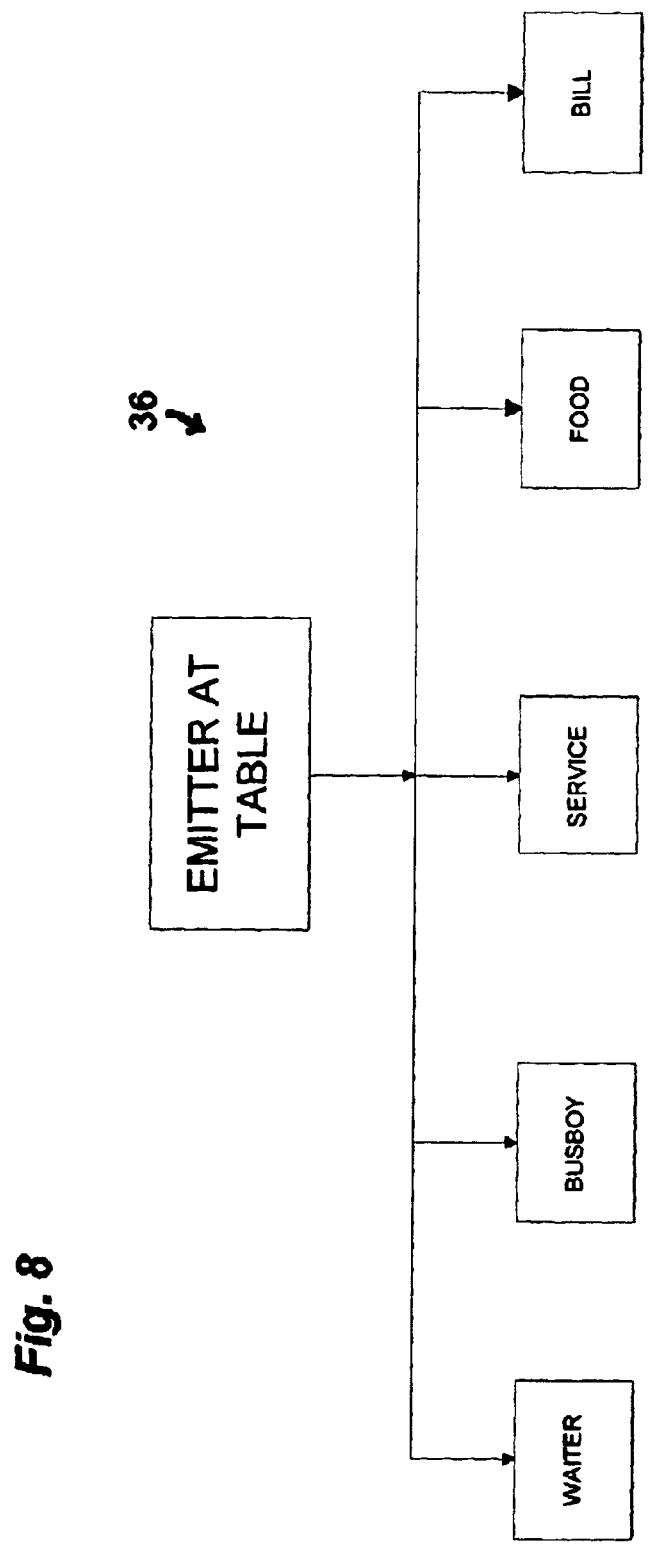

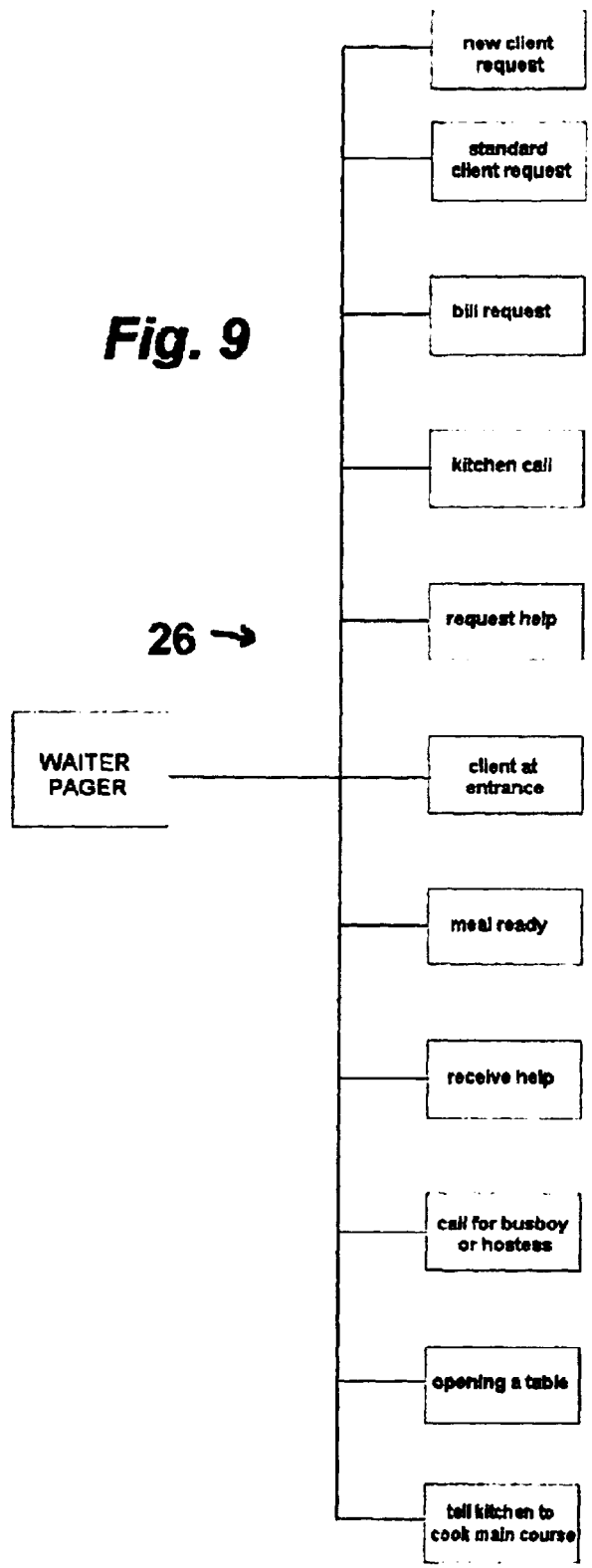

COMPUTERIZED SYSTEM FOR THE MANAGEMENT OF PERSONNEL RESPONSE TIME IN A RESTAURANT

This application claims priority based on provisional application 60/406,573 filed Aug. 29, 2002.

BACKGROUND OF THE INVENTION

1. Field of the Invention

The present invention relates to restaurants, computer networks, wireless portable computers and more specifically to a restaurant service and transaction monitoring; time management; and processing system and method.

2. Background of the Invention

Restaurant ordering hasn't evolved in decades. Indeed, most establishments still have waiters use a paper check hand-carried back to the kitchen. Waiters then have to get back to the kitchen to see if the order is ready. This is very time-consuming and inefficient.

In recent years, some form of automation has taken place such as the use of two-way radios to communicate with the kitchen as well as some electronic entries of orders for accounting purposes. There is mention in U.S. Pat. No. 5,838,798 by Stevens of a transaction processing system and method which utilizes modified cordless phones to transmit orders from the tables to the kitchen and a transaction processing terminal which completes the transaction. U.S. Pat. No. 4,569,421 by Sandstedt and U.S. Pat. No. 4,530,067 by Dorr describe more elaborate systems with more functionalities.

In more details, patent 798 describes a restaurant transaction processing system which employs low-cost cordless phone transceivers to transmit orders. A server includes a first cordless telephone transceiver. A portable computer includes a second cordless telephone transceiver and transfers order data to the first computer. The first and second cordless telephone transceivers preferably operate at frequencies designated by the FCC and have a transmission range less than five thousand feet. The system may also include a kitchen terminal which is coupled to the server through a network, and a transaction processing terminal which is also coupled to the server through the network. The server maintains transaction data, routes orders to the kitchen terminal, and routes order ready signals from the kitchen terminal to the portable computer. The transaction processing terminal completes payment for the orders.

Patent 421 describes a vending system particularly adapted for a restaurant or retail sales outlet which includes a handheld portable data entry terminal containing a repertoire or library of sales or menu items addressable by entering a product code. The handheld terminal, upon receiving an operator entered order entry, relays the order to an order filling station as well as to a local and remote data processor over a wireless communications link. A printout of an order is provided by the terminal. Each terminal also includes wireless transceivers for paging, with a plurality of customer order stations.

Patent 067 describes a method and the apparatus for management information and control for restaurants. The apparatus includes a plurality of remote communications units carried by waiters. A central interrogator transceiver periodically interrogates each of the remote units after which the remote units transmit information back to the central interrogator transceiver. The central interrogator transceiver couples the information transmitted thereto to a central processor. The central processor then provides order information to a kitchen display, an order assembly display, a service bar display, a table status display and to a check printer-cash register unit. The order information is also coupled to an inventory control unit. A number of computations are made such as the number of particular items ordered, the rate of turnover of customers, quantity of items in inventory, etc. which information is retrievable to give the restaurant management information with regard to the operational characteristics, for example, food flow of the restaurant.

One problem which is not properly addressed especially in large restaurants with a high rate of customer turnover is a way of monitoring which tables are empty and ready to receive new clients. More often than not, the hostess or maitre d' is not in a position to see all tables and assess their status, and communication between the busboys or the waiters cannot always be relied upon. U.S. Pat. No. 5,272,474 by Hilliard addresses this issue but only this issue.

Another problem in restauration concerns the client himself who has to wave at the waiter or busboy or otherwise attract their attention in order to get service. U.S. Pat. No. 5,594,409 by Shank, U.S. Pat. No. 6,366,196 by Green, U.S. Pat. No. 4,935,720 by Kalfoun, U.S. Pat. No. 4,777,488 by Carlman, U.S. Pat. No. 4,701,849 by Elden all address this issue but only this issue.

None of the prior art studied describes a system that handles work flow, employee performance, response time, food and service quality in an integrated seamless system and provides the owner or manager with easy to understand printable documents for evaluation purposes. The systems and methods described above are either too simple or too complex and therefore there is a need for a more desirable and user friendly computerized system for managing personnel response time in a restaurant.

SUMMARY OF THE INVENTION

In accordance with the teachings of the present invention, a computerized system for managing personnel response time in a restaurant is provided. The system employs a combination of short range RF or IR signal transmission protocols with handheld or wearable computers along with a central server and a variety of input devices and display devices such as button consoles, monitors and bar code readers, the latter to mark the time between reception and delivery of an order. Some elements of the network, such as communications between the server and the kitchen can be done via cable since these two units are not roving, but communication between busboys, waiters and tables (clients) are done wirelessly by way of the server which acts as a dispatcher. Each of the aforementioned components are currently off the shelf hardware requiring little or no modifications. It is therefore not in the hardware itself but rather in the arrangement of the hardware and the creation of customized firmware and software as well as work methods that the invention lies.

Besides handling most of the functions described in the preceeding section, this invention also has provisions for the client to enter a service evaluation grade as well as a food appreciation grade. These two functions which are inputted directly from a console on each table—the same console used for calling busboys or waiters—are not found in any of the prior art.

It is accordingly an object of the present invention to provide a system and method for managing restaurant personnel.

It is another object of the present invention to provide such a system and method using RF and or IR devices, portable devices and a central server.

It is yet another object of the present invention to provide a system for clients to page waiters and busboys from the tables; for waiters to know food order status; to know when a client is ready to receive the check; and for clients to be able to rate the level of satisfaction of both the food and the service they have received.

It is a further object of the present invention to provide a system which can produce detailed reports of work activity and personnel response time for the benefit of a manager or owner.

It is a final object of the present invention to provide a method for improving service and increase client satisfaction.

Although the present description refers mostly to restaurants, it is easy to see that the present system is equally applicable to bars, and any other types of nightly entertainment facilities and even retail establishment and any type of service business where there is interaction between clients and employees.

Other objects, features, and advantages of this invention will become more readily apparent from the following detailed description of a preferred embodiment with reference to the accompanying figures, wherein the preferred embodiment of the invention is shown and described, by way of examples. As will be realized, the invention is capable of other and different embodiments, and its several details are capable of modifications in various obvious respects, all without departing from the invention. Accordingly, the figures and description are to be regarded as illustrative in nature, and not as restrictive.

BRIEF DESCRIPTION OF THE PREFERRED EMBODIMENT

FIG. 8 is a schematic of the emitter at table

FIG. 9 is a schematic of the functions of the waiter transceiver

DETAILED DESCRIPTION OF THE PREFERRED EMBODIMENT

Figure 1:
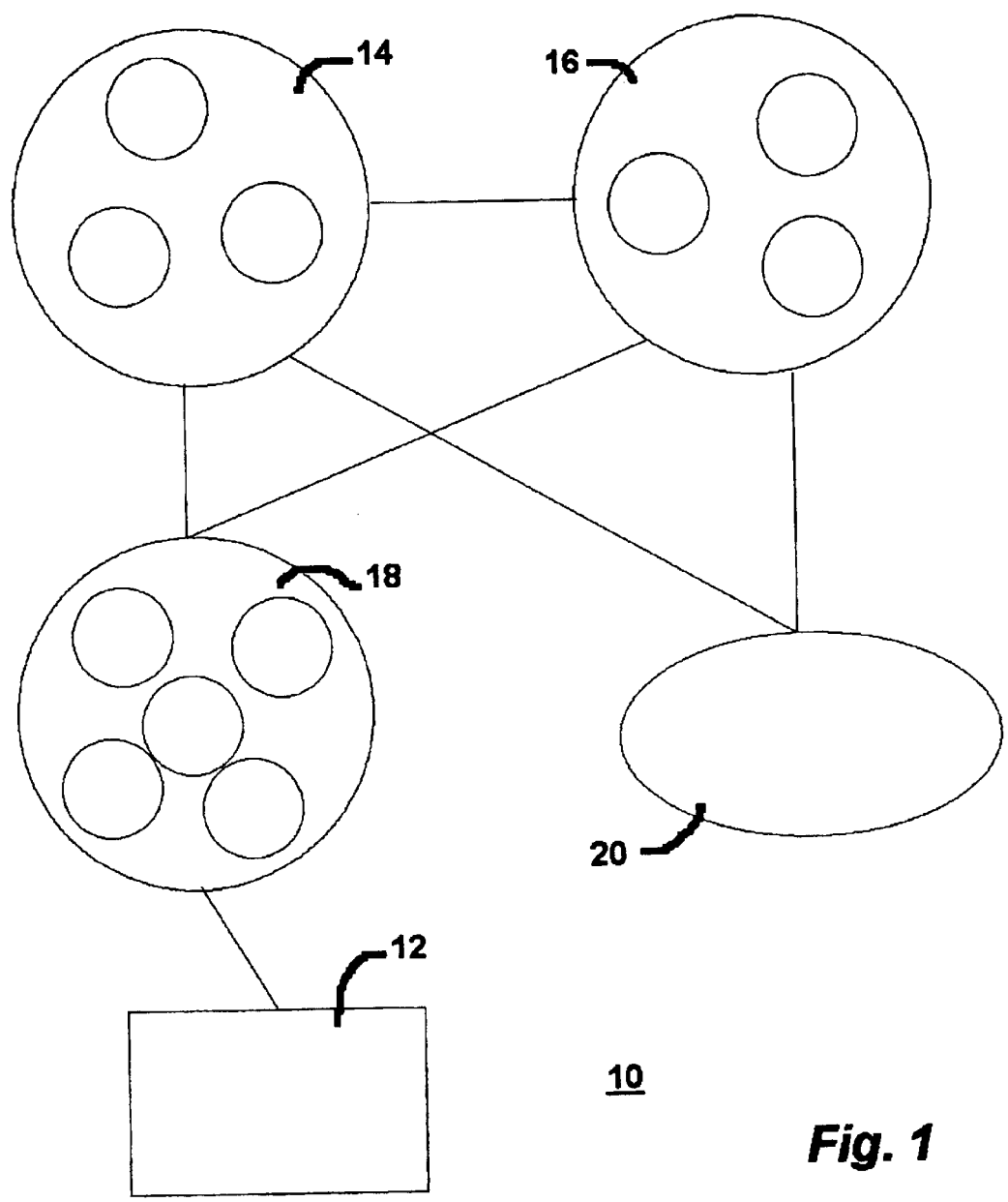
FIG. 1 is a diagram showing the relationship between the various components of the system.

FIG. 1 A computerized system for managing personnel response time in a restaurant (10) has a server (12) controlling all of the followings: grouping of busboys (14), grouping of waiters (16), grouping of tables (18), and the kitchen (20). Although all communications go through the server (12), the lines here only illustrate which group can communicate with which. For example, the tables (18) communicate to the server (12) when responding to a survey. The tables (18) also have one way communication with the busboys (14) or the waiters (16). The kitchen (20) can send calls towards the busboys or hostesses (henceforth described as busboys) (14) and the waiters (16). The waiters(16) can communicate with the busboys (14) and vice versa. All communications go through the server (12) which acts as a dispatcher of sorts.

Figure 2:
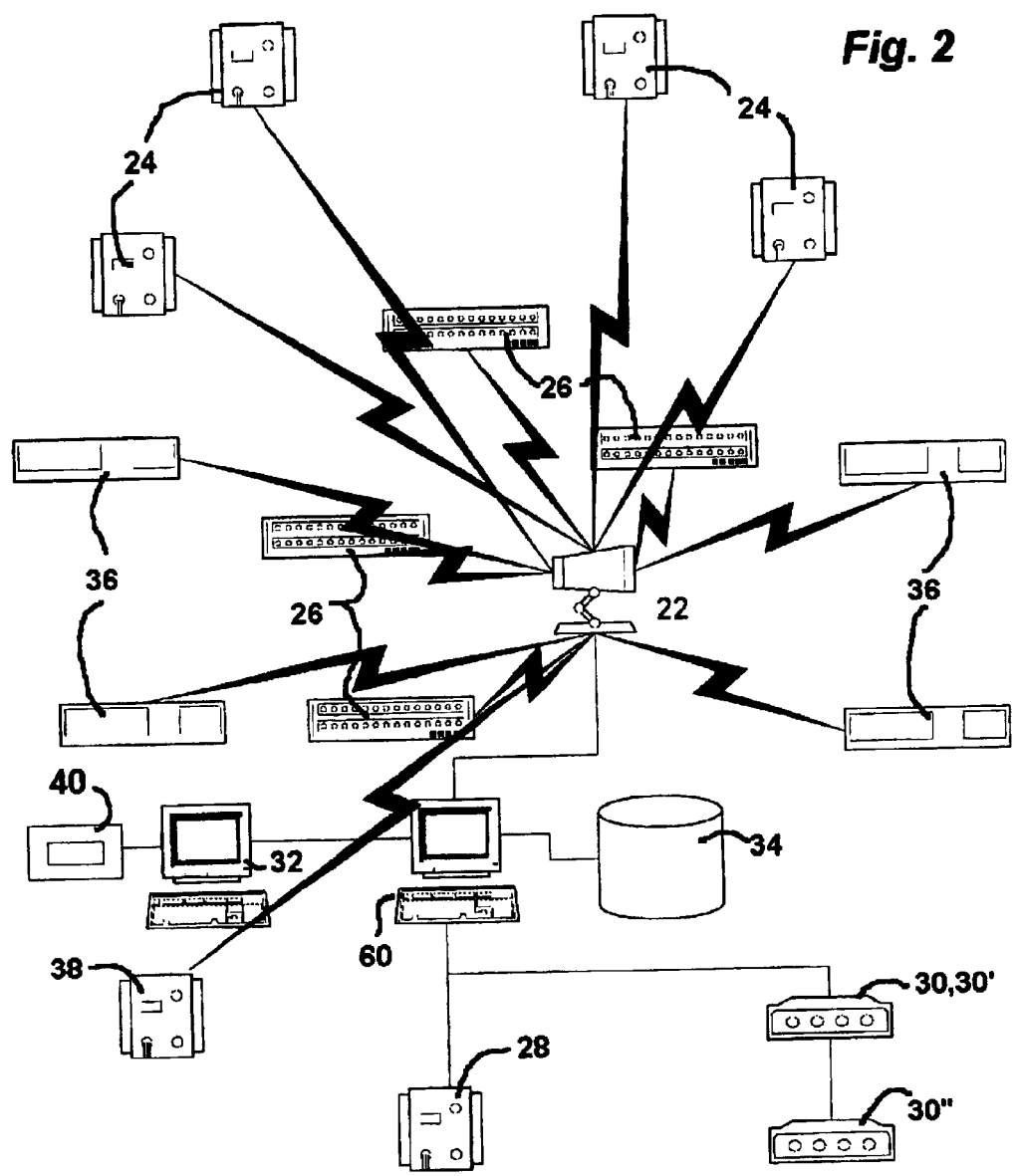
FIG. 2 is a schematic of the cable and wireless connections between the various elements of the system.

Using Radio Frequency (RF) transmissions or other types of wireless comm such as IR, as per FIG. 2 a central transceiver (22) receives all incoming signals from the various busboy pagers (24) and waiter pagers (26) and transmits outgoing signals to the pagers (24), (26). All transmissions are data only, and not voice. All communications, both incoming and outgoing, go through the central transceiver (22) which sends the signal to the server (12) for processing before communication can reach its final destination. A central database (34) keeps track of all transmitted data. Using simple pager signals such as lights, beeps or vibrations, employees like busboys/hostesses (14) and waiters (16) can be made aware of requests. For example, a table (18) can ask either a busboy (14) or a waiter (16) for service. More functions will be described later. The kitchen (20) also has a pager (28) as well as a bar code reader (30) generally situated near the order window with its accompanying waiter bar code reader (30') situated nearby. A monitor screen (32) shows the sequence of orders and to which waiter (16) it is attributed to, but more on that later.

As FIG. 2 shows, all communications go through the transceiver (22) which is generally located centrally and preferably, but not necessarily, near the ceiling. Busboys and hostesses (14) have busboy pagers (24) and waiters (16) have waiter pagers (26). The term <<pagers>> is not used here in the usual sense of the well known telecommunication devices but rather as a local communication device and they can come in various guises convenient for restaurant workers. For example, a practical shape that such a pager could have is the shape of a wristwatch or a handheld unit that can be combined with the order taking pad, or else, the unit can be clipped at the beltline. Besides the busboy/hostess (24) and waiter pagers (26), there is also a kitchen pager (28) which can communicate with the busboy pagers (24) as well as the waiter pagers (26). FIG. 2 also shows bar code readers (30) and (30'); a database (34); and a monitor screen (32) for use by waiters (16).

Figure 4:
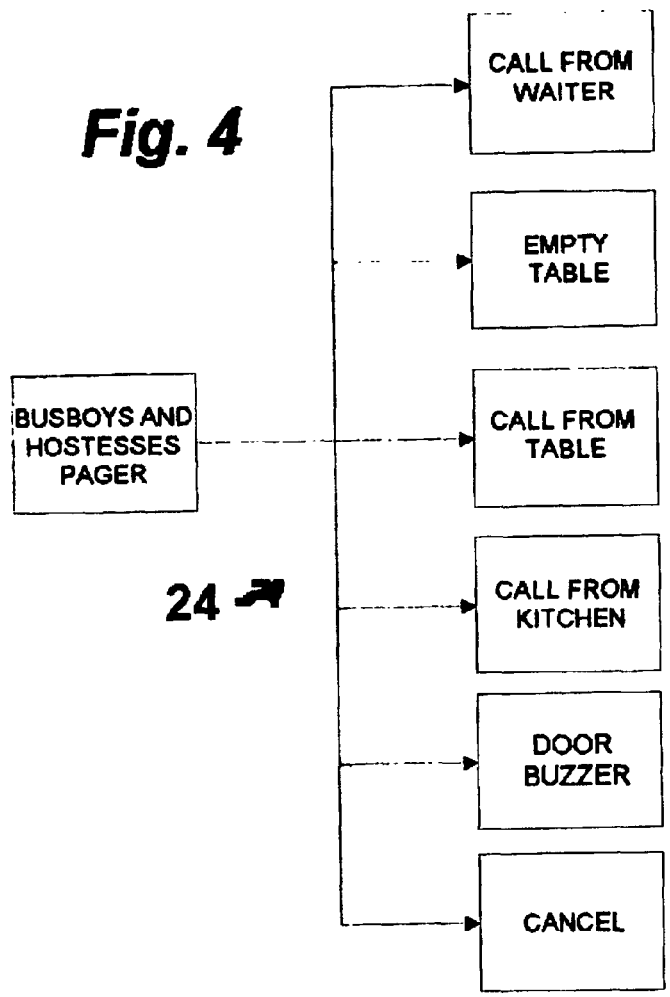
FIG. 4 is a schematic of the functions of the busboy/hostess transceiver

The various functions of the busboy pagers (24) are illustrated in FIG. 4. A busboy (14) can receive a page from a waiter (16) indicating which table requires service, it can be either to clear the table or fill the glasses with water or any other duties usually done by a busboy (14). A table (18) can also send a request to the busboy (14). Some restaurants do not have hostesses and some restaurants can also have hostesses perform duties usually performed by busboys. Since busboys and hostesses pagers (24) are essentially the same, it is just a matter of blocking a signal from tables (18) to pagers worn by hostesses (14). Since this is a case by case choice, it can be easily set using the server's (12) interface. In order to keep the busboy pagers (24) simple, it is not necessary for the pagers (24) to specifically cite the duty required from the busboy (24), he should realize that if a table (18) is empty, it needs to be cleared or if glasses are empty or nearly so, they need repleneshing, if ashtrays are full they need to be changed and so on. Essentially, whether the call originates from the clients at the table (18) or from a waiter (16), the busboy (14), through experience, should anticipate the needs or be able to fulfil any requests swiftly. When a table (18) requests the check, it means that the table (18) will soon be empty, therefore that request is sent to the waiter (16) and to the busboy/hostess(14), to whom it means that the table (18) will need to be cleared and set for the next clients and that, for the hostess, a table (18) will soon be ready to receive new clients. Since the waiter (16) has also been called, the check should soon reach the table (18) and be paid and therefore there is little wasted time or empty tables (18) since the busboy (14) is already aware that a table (18) will need clearing very soon and the hostess (14), knowing that a table (18) will be cleared and set very soon, can already estimate how long before she can place the next clients. Lastly, the busboy and hostess pager (24) can receive calls from the kitchen (20). For example, there are extreme cases when waiters (16) are overloaded and a meal needs to be served rapidly to a table (18), therefore, the kitchen can page a busboy (14) to handle that chore.

Figure 5:
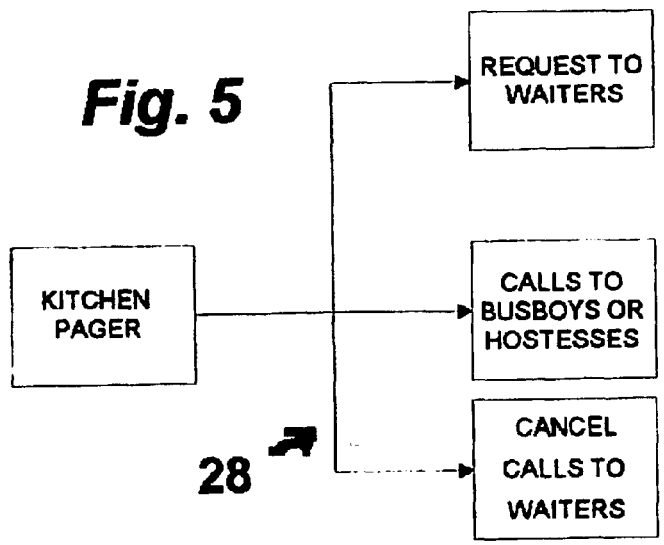
FIG. 5 is a schematic of the kitchen transceiver

FIG. 5 shows that the kitchen (20) also has its own kitchen pager (28). It is relatively simple, it can page either a busboy (14) or a waiter (16). Since the kitchen (20) is not roaming, this paging system can be hard wired to the server (12). Because communications between the kitchen (20) and the waiters (16) are critical (for example there could be confusion or lack of clarity on a client's order), a waiter (16) cannot press a button on his waiter pager (26) to cancel a call from the kitchen (20), only the kitchen (20) can do that once the call has been satisfactorily answered.

Figure 6:
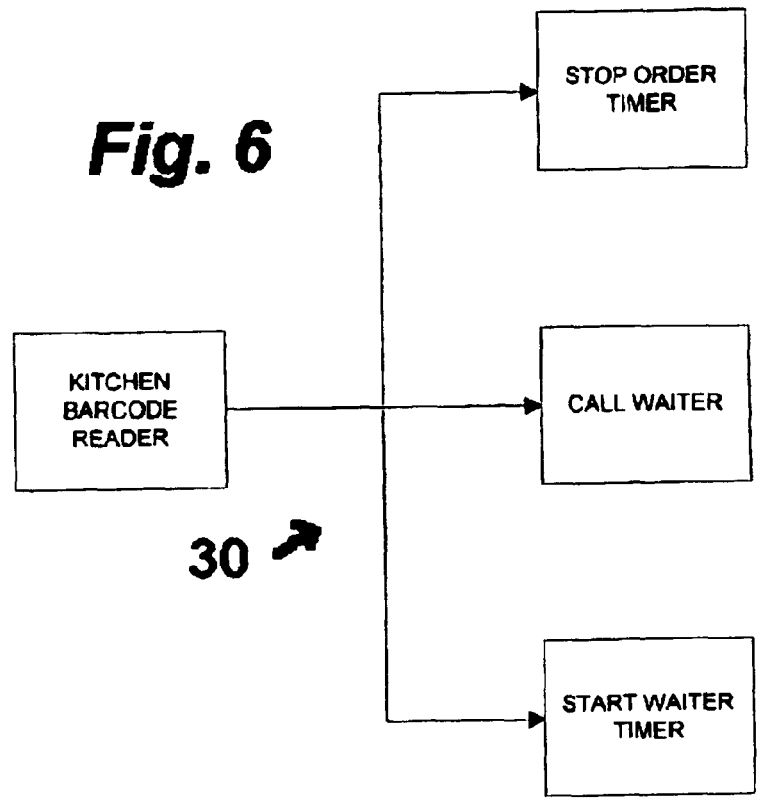
FIG. 6 is a schematic of the kitchen bar code reader

FIG. 6 shows the kitchen bar code reader (30) which, for practical reason and to avoid confusion, is generally but not necessarily, divided into two separate units, the aforementioned kitchen bar code reader (30) or more specifically, kitchen side bar code reader (30') and a waiter bar code reader (30"). Whether the waiter (16) takes on the client's order on a traditional paper pad or takes it on a portable electronic device, in the end the order is entered into the server (12) either by way of the portable electronic device or by one single terminal situated at a convenient location for the waiters (16). Once the order is entered, again, it can take two distinct paths: It can be displayed on a kitchen monitor (60) and/or it can be printed on paper in the kitchen (20). This starts a timer in the server (12) which measures the time taken by the cook to fulfill the order. The server (12) has a database (34) which has a list of times for each meal. This insures that the cook performs his duty in a timely manner. Since the database (34) keeps track of all orders taken in a given time, it can make recommendations as to when a supplementary cook may be needed. This information can be of importance to the restaurant manager or owner so that, upon seeing emerging patterns, he can anticipate future manpower requirements.

Figure 7:
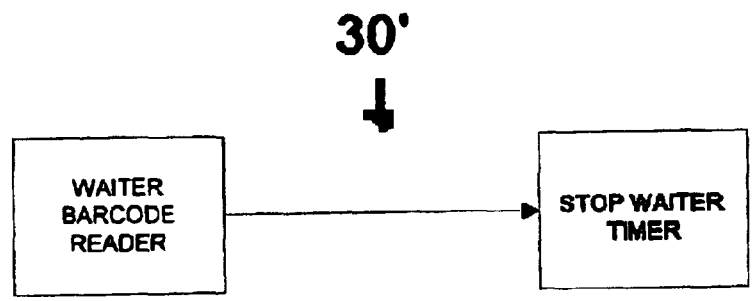
FIG. 7 is a schematic of the waiter bar code reader

Once the cook has finished an order, he puts it at the window and scans the paper order onto his kitchen barcode scanner (30) which stops his timer, telling the server (12) the time taken to fulfill the order and at the same time the scan at the kitchen barcode scanner (30) calls the waiter (16) affected to this order and starts the timer on that waiter's (16) response time. Once the waiter (16) arrives to pick up his order, he puts the paper order into the slot of a waiter barcode unit (30') on FIG. 7 which scans the barcode printed on the paper order, stops the timer on the waiter's (16) response time and destroys the piece of paper.

Figure 3:
FIG. 3 is a schematic of the display screen for use by waiters

As seen on FIG. 3, a monitor screen (32) situated at the order window allows the waiters (16) to monitor the orders priority as there may be more than one order ready at a time. It also shows the table (18) the order goes to and the waiter (16) responsible for it. For example, Mark appears to be quite busy wheras Jenny is less busy, therefore Jenny could help Mark with his duties. The order on which the names are entered, from top to bottom indicates from the earliest to the latest order entered. Therefore, the waiter's (16) name on the top row, accompanied by the table's (18) number indicates the earliest entry and which table (18) it is associated with, and next to the table (18) number is the time remaining to serve that table (18). In this example, Mark has to handle three entrées, one main course and two desserts. Since Jenny is far less busy, Mark can request help using his waiter pager (26) to send a call to other waiters (16). A button on the waiter pager (26) allows for a waiter (16) to tell the other waiter (16) in need that his call for help has been received and will be taken care of.

FIG. 8 shows the different functions a table emitter (36) has: It can call a waiter (16), a busboy (14), it can respond to a service quality survey, a food quality survey and can ask for the check. The survey's results are sent to the server (12) for statistics.

FIG. 9 describes the functions of a waiter pager (16) which can: Receive a new client request, this is the initial call to which the waiter (16) must respond to in order to lock in the table (18) (described later), typical table (18) service requests, receive a request for the check from a table (18), receive a call from the kitchen (20), send a request for help to other waiters (16), receive an indication that clients are at the door (see below), that a meal is ready to be picked up at the kitchen (20), that a waiter (16) will provide help (which automatically cancels the help request sent to all other waiters (16) ), send a call to a busboy/hostess (14), indicate that a new table (18) has been opened and tells the kitchen (20) when to start preparing a main course. Regarding the last two items, firstly, when a waiter <<opens>> a new table (18), what it does is that it locks the table (18) to him so that when clients call for service, only that waiter (16) will be paged. Usually, a waiter (16) is assigned to a zone and should respond to a table (18) even before a client at a table (18) has time to press a button to call a waiter (16). In the event that a table (18) should call a waiter (16), the call is sent to all waiters (16) and it is the waiter (16) assigned to the zone where that table (18) is who should make an effort to respond to that call. When the waiter (16) responds to the call to <<open>> a table (18), he inputs the table's (18) number as well as the number of person sitting in, once this is done, that table (18) is locked to that waiter (16). Once a new client has called a waiter (16) for the first time, there is a time span allowed for a waiter (16 ) to respond, if no waiters (16) respond within a given time, the computer calls again and if there is still no response, all waiters (16) are penalized for their slow response time.

Secondly, regarding the last item which is to tell the kitchen (20) to start preparing a main course, this function is to help in a timely preparation of meals. The server has a series of preset average times taken by clients to eat their entrées, by paging a waiter (16) this gives a cue to check the table (18) and see if the clients will soon be ready to receive their main course and if so, the waiter (16) should tell the kitchen (20) to start cooking the main course so that it will be ready exactly when the table (18) will be ready for it. This prevents a meal from being ready too soon and needing to be kept under heating lamps.

Optionally, an entrance pager (38) can also be installed at the entrance to announce to the host or hostess (14), or else all waiters (16), that new clients have arrived. Additionally, a cash register pager (40) near the cash register can call for a waiter(16) in case there is an error in the client's check that needs clarification.

What is claimed is:

1. A computerized system for the management of communications between personnel and personnel response time comprising:

a server controlling groupings of busboys, hostesses, waiters, tables and a kitchen or bar by giving target response time and measuring response time;

a wireless two-way communication system linking said grouping of waiters with said grouping of busboys;

a kitchen monitor screen in said kitchen indicating orders and their preparation time along with the time left for said preparation;

a monitor screen for waiters to monitor order priority;

said grouping of waiters with a grouping of tables;

said grouping of waiters with said kitchen;

said grouping of waiters with said bar when said bar is present;

a grouping of tables with a table emitter having one way communication with said server wherein said server receiving responses to food and service quality surveys;

a grouping of tables with said table emitter having one way communication with said server wherein said server dispatching to said grouping of busboys and said grouping of waiters;

said kitchen having a kitchen pager having two way communication with said grouping of busboys and said grouping of waiters by way of said server;

said grouping of waiters having waiter pagers having two way communication with said grouping of busboys having busboy pagers, by way of said server;

a kitchen bar code reader for acknowledging reception of food order, readiness of food order, paging of waiter and pickup of food order by waiter or busboy, and sending collected data to said server;

a waiter bar code reader for acknowledging pick up of food;

said server receiving and sending all calls through a transceiver;

a central database to keep track of all transmitted data;

said server processing all information received into reports.

2. A computerized system for the management of communications between personnel and personnel response time as in claim 1 wherein:

all transmissions being through IR.

3. A computerized system for the management of communications between personnel and personnel response time as in claim 1 wherein:

all transmissions being through RF.

4. A computerized system for the management of communications between personnel and personnel response time as in claim 1 wherein:

pagers using signals taken from the group but not limited to lights, beeps, vibrations.

5. A computerized system for the management of communications between personnel and personnel response time as in claim 1 wherein:

said kitchen pager being hardwired to said server.

6. A computerized system for the management of communications between personnel and personnel response time as in claim 1 wherein:

said server processing all information received into printed reports.

7. A computerized system for the management of communications between personnel and personnel response time as in claim 1 wherein:

an entrance pager indicating the arrival of new clients.

8. A computerized system for the management of communications between personnel and personnel response time as in claim 1 wherein:

a cash register pager situated near the cash register.

9. A computerized system for the management of communications between personnel and personnel response time as in claim 1 wherein:

only said kitchen can cancel a call from said kitchen pager to said waiter pager.

10. A computerized system for the management of communications between personnel and personnel response time as in claim 1 wherein:

said kitchen bar code reader is divided into a kitchen side bar code reader and a waiter bar code reader.

11. A computerized system for the management of communications between personnel and personnel response time as in claim 1 wherein:

said server measuring response time in said kitchen by measuring the time between a received order in said kitchen to the time said kitchen scans said order into said kitchen bar code reader.

12. A computerized system for the management of communications between personnel and personnel response time as in claim 11 wherein:

response time beginning when said order being displayed on said kitchen monitor.

13. A computerized system for the management of communications between personnel and personnel response time as in claim 11 wherein:

response time beginning when said order being printed on a printer.

14. A computerized system for the management of communications between personnel and personnel response time as in claim 1 wherein:

said server measuring response time of said waiter by measuring the time between said kitchen having scanned said order into said kitchen bar code reader and the time said waiter scanning said order into said waiter bar code reader.

15. A computerized system for the management of communications between personnel and personnel response time as in claim 1 wherein:

said waiter monitor screen displaying the order on which waiters' names are entered, from top to bottom, from earliest to latest order entered.

16. A computerized system for the management of communications between personnel and personnel response time as in claim 15 wherein:

said waiter monitor screen displaying table number with associated waiter and time remaining to serve said table.

17. A computerized system for the management of communications between personnel and personnel response time as in claim 1 wherein:

said waiter pager having a button acknowledging another waiter in need that his call for help has been received.

18. A computerized system for the management of communications between personnel and personnel response time as in claim 1 wherein:

said grouping of tables with said table emitter having one way communication with said server wherein said server dispatching to said grouping of waiters to ask for the check.

19. A computerized system for the management of communications between personnel and personnel response time as in claim 1 wherein:

said waiter pager able to receive a new client request, to lock in said table;

service requests from said table;
receive a request for the check from said table;
receive a call from said kitchen;
send a request for help to other waiters;
receive an indication that clients are at the door
receive a call that a waiter will provide help;
send a call to said busboy;
indicate that a new table has been opened;
tell said kitchen when to start preparing a main course.

20. A computerized system for the management of communications between personnel and personnel response time as in claim 1 wherein:
said server measuring response time between a new client calling said waiter and the time said waiter or said grouping of waiters answers and a penalty for slow response time;
said server having a series of preset average times taken by clients to eat so as to page said waiters.

* * * * *